United States Patent [19]
Pettersson

[11] Patent Number: 4,776,733
[45] Date of Patent: Oct. 11, 1988

[54] CUTTING TOOL
[75] Inventor: Lars T. Pettersson, Gävle, Sweden
[73] Assignee: Sandvik AB, Sandviken, Sweden
[21] Appl. No.: 78,719
[22] Filed: Jul. 28, 1987
[30] Foreign Application Priority Data
Aug. 15, 1986 [SE] Sweden .................. 8603429
[51] Int. Cl.⁴ .............................. B26D 1/00
[52] U.S. Cl. ................... 407/114; 407/116; 407/117
[58] Field of Search ............... 407/113, 114, 115, 116, 407/117

[56] References Cited
U.S. PATENT DOCUMENTS

| | | | |
|---|---|---|---|
| D. 234,545 | 11/1880 | Dewey | 407/116 |
| 3,792,515 | 2/1979 | Lundgren | 407/116 |
| 4,583,887 | 4/1986 | Wertheimer | 407/116 |

FOREIGN PATENT DOCUMENTS

| | | | |
|---|---|---|---|
| 2840610 | 3/1979 | Fed. Rep. of Germany | 407/114 |
| 3618574 | 3/1986 | Fed. Rep. of Germany | 407/114 |

Primary Examiner—Frederick R. Schmidt
Assistant Examiner—Blynn Shideler
Attorney, Agent, or Firm—Burns, Doane, Swecker & Mathis

[57] ABSTRACT

A cutting tool for chipforming machining of work pieces is of the type comprising a rake face and a clearance face. A cutting edge is formed at the intersection of the rake and clearance faces. The cutting edge is intersected by a depression extending along the rake face. The depression intersects a projection formed at the clearance face.

11 Claims, 5 Drawing Sheets

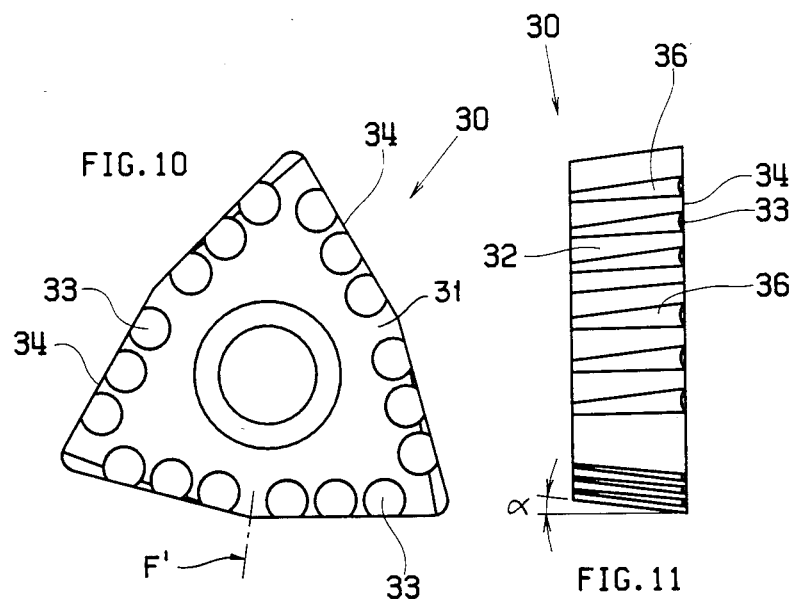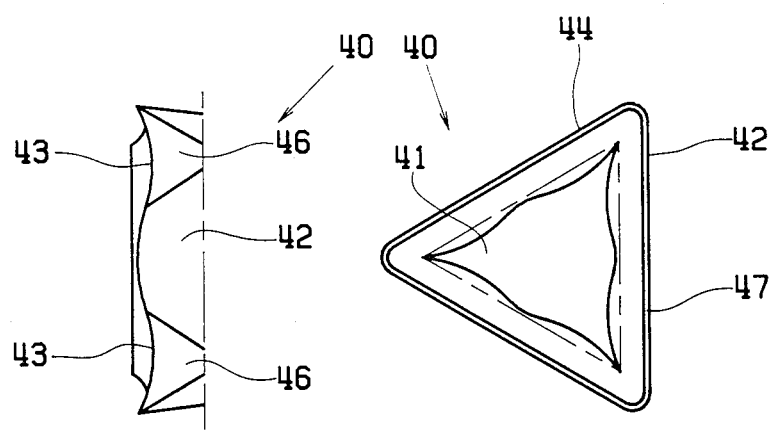

CUTTING TOOL

BACKGROUND AND OBJECTS OF THE INVENTION

The present invention relates to cutting tools for chipforming machining preferably metallic work pieces.

Such cutting tools are normally provided with one or more cutting edges formed by the transition between the top surfaces or rake faces of the tool and its side surfaces or clearance faces. Some of these tools are provided with wave-shaped cutting edge or depressions formed in the rake face intersecting the cutting edge. Hitherto such tools have not been suitable for groove cutting since the cutting edge or the depression generates an annular rib at the bottom of the groove. The wave-shaped cutting edge or the depression, however, is favourable from the chip control point of view since it reduces the width of the chip such that the chip will not rub against the walls of the groove.

An object with the present invention is to provide a cutting tool having a wave-shaped cutting edge or a cutting edge with depressions, which is able to produce a planar work piece surface.

Another object is to provide a cutting tool having excellent chip forming characteristics.

THE DRAWINGS

These and other objects are obtained by the present invention, which is more clearly described hereinafter in connection with the appended drawings.

FIGS. 10 and 11 show an alternative cutting insert according to the present invention in a plan view resp a side view, respectively.

FIGS. 12 and 13 show another alternative cutting insert according to the present invention in a plan view and a side view, respectively.

DESCRIPTION OF PREFERRED EMBODIMENTS OF THE INVENTION

Figure 1:
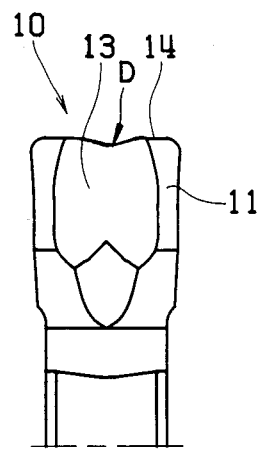
FIGS. 1 to 3 show a conventional groove cutting insert in a plan view, a front view and a side view, respectively.
Figure 2:
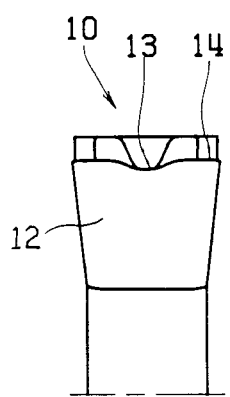
Figure 3:
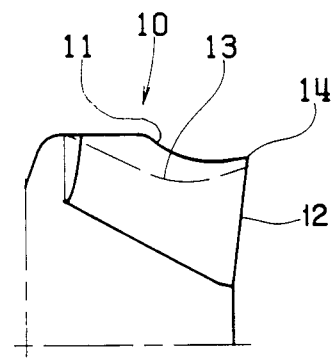
Figure 4:
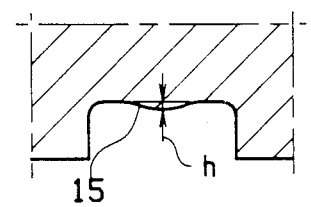
FIG. 4 shows a work piece cut by the conventional insert in cross-section.

FIGS. 1 to 3 show a conventional cut-off insert 10 comprising a rake face 11, a clearance face 12 and a depression 13. The rake face and the clearance face form an acute edge angle. The depression intersects the cutting edge 14 formed at the junction between the rake and the clearance faces so as to form a depression D in the cutting edge as the rake face is viewed in plane (see FIG. 1). This insert has an excellent chip control during parting operations, since the width of the chip is reduced by the depression 13. However, during a grooving operation the edge depression D leaves an annular rib 15 (FIG. 4) whose height H is too large to be acceptable without finishing operations.

Figure 5:
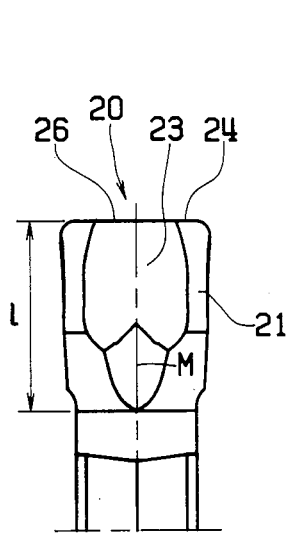
FIGS. 5 to 7 show a cutting insert according to the invention in a plan view, a front view and a side view.
Figure 6:
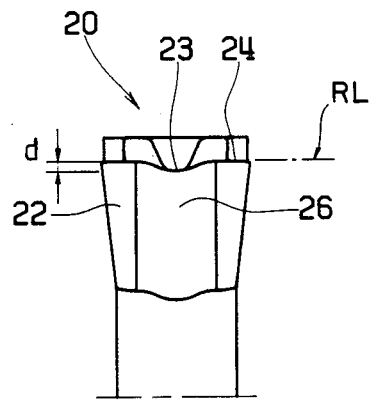
Figure 7:
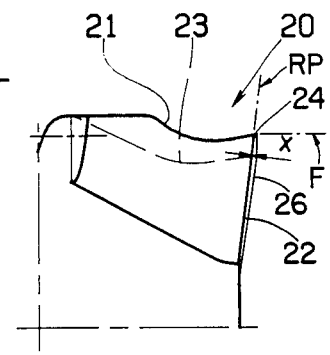

FIGS. 5 to 7 show a cut-off and grooving insert 20 according to the present invention. The insert 20 comprises a rake face 21 and a clearance face 22 which is inclined such that the rake face and the clearance face form an acute edge or clearance angle. The rake face 21 extends generally in the front-to-rear direction F of the insert body. The intersection of the rake and clearance faces form a cutting edge 24 extending transversely of the front-to-rear direction F. The insert is provided with a depression 23 intersecting the cutting edge 24. The depression 23 is concavely curved and extends along the rake face 21. The depression is formed with a cross-sectional area of a segment of a circle. Among other suitable forms may be mentioned a semicircular area form. The depression may have uniform cross-section along its principle extension or longitudinal extension. The depression has a length l and a depth d. The length is larger than the depth d. The rake face and depression establish a chip-guiding face.

The clearance face 22 is provided with a forwardly protruding ridge or projection 26. The projection is convexly curved and extends along the clearance face. The projection is formed with a periphery of a semi-cylinder, a segment of a cylinder or a segment of a cone whose apex is facing away from the rake face 21. The projection intersects the depression along a curved line producing a cutting edge lying in a common plane with the original cutting edge 24, such that the line appears straight when the face face is viewed in plan (see FIG. 5).

The depression and the projection are arranged symmetrically about the midline M of the insert. The projection 26 projects at the curvd intersection line a distance x perpendicularly from the clearance face 22. The distance is defined by the formula $x = k \cdot d$, where d is the depth of the depression from a reference line RL that intersects the ends of the cutting edge. The letter K corresponds to the sine of $\beta$ and thus depends on the inclination angle $\beta$ of the curved line (see FIG. 8). As can be seen in FIGS. 6 and 7, the projection protrudes forwardly beyond a reference plane RP, which plane contains the reference line RL and extends parallel to the direction of slope of the clearance face.

Figure 8:
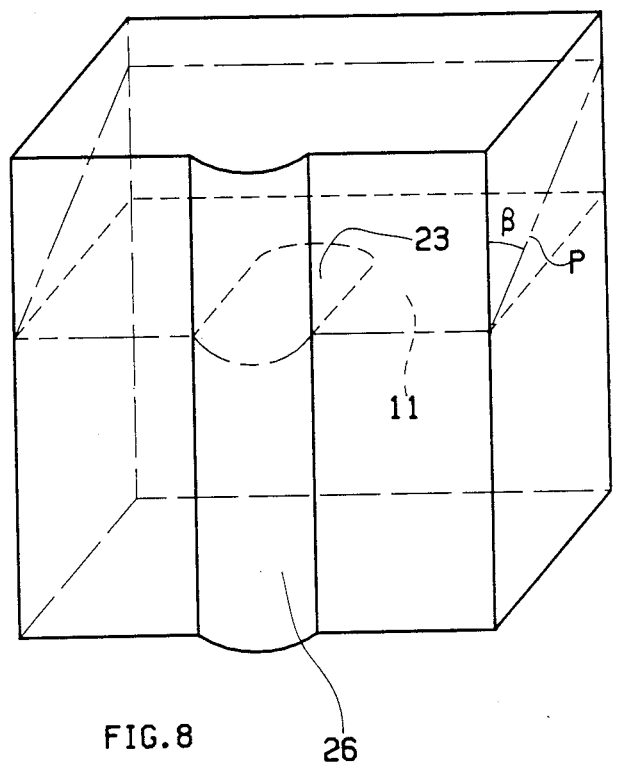
FIG. 8 shows an illustration of the present invention in a perspective view.

In order to facilitate the understanding of the present invention FIG. 8 shows a cube, one face of which is provided with a semicylindrical projection 26. The cube is cut along a plane P forming an acute angle $\beta$ with said face. When viewing at the lines of intersection of the plane P and the cube along the plane P only a straight line can be seen. This means that when the cutting insert is tilted to a certain degree the cutting edge will have a straight shape along its entire length thereby producing a groove in the work piece having, if any, a very small annular rib. The angle $\beta$ is chosen between 5 and 85 degrees. The depression 23 and the rake face 11 are shown in dotted lines.

The conventional cutting insert 10 and the cutting insert 20 according to the invention are compared as grooving tools in FIGS. 9A, 9B, 9C and 9D.

Figure 9A:
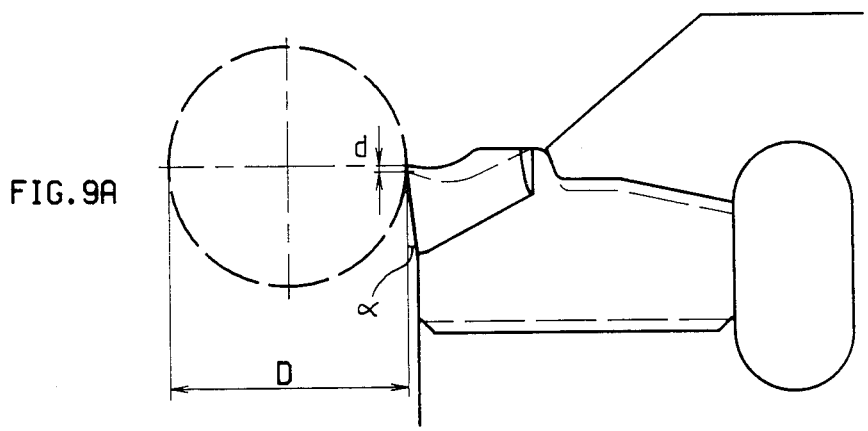
FIG. 9A shows a cutting tool engaging a work piece in a side view.

FIG. 9A shows a cutting insert engaging a work piece. The work piece has a diameter D. The insert has a depression whose depth is depicted as d. The insert has a clearance angle $\alpha$.

Figure 9B:
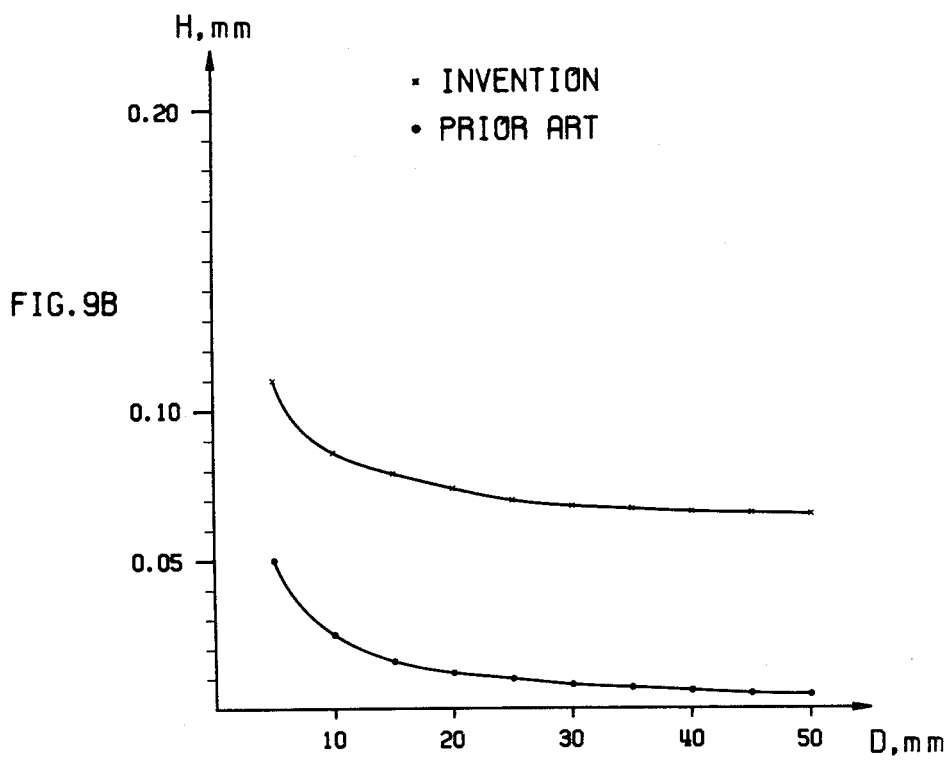
FIG. 9B shows a diagram showing the height of an annular rib as a function of the work piece diameter.

FIG. 9B shows the height H of the annular rib as a function of the work piece diameter D when the depth d is 0.5 mm and the angle α is 7 degrees. As an example: when the diameter D is 30 mm the height H of the rib arising from grooving with the conventional insert is 0.07 mm and the height H of the rib arising from grooving with the present insert is 0.008 mm. When the diameter of the work piece is about 70 mm the present insert does not produce any rib at all. This means that for a certain work piece diameter the features α and d may be selected to achieve a planar work piece surface.

Figure 9C:
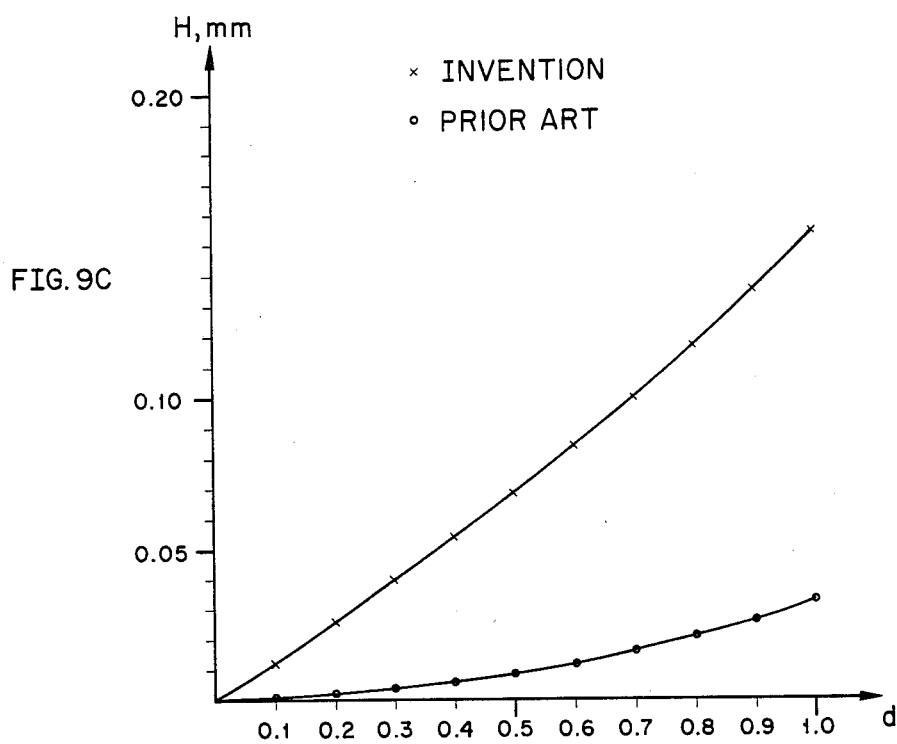
FIG. 9C shows a diagram showing the height of the annular rib as a function of the depth of the depression.
Figure 9D:
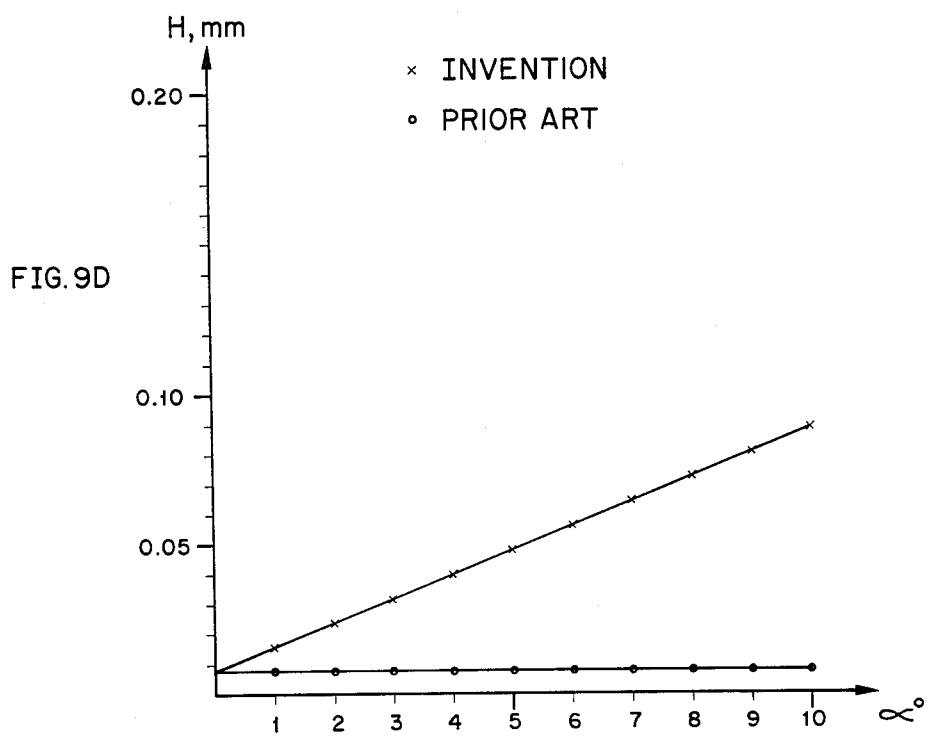
FIG. 9D shows a diagram showing the height of the annular rib as a function of the clearance angle.

FIG. 9C shows the height H of the rib as a function of the depth d of the depression when the diameter D is 30 mm and the angle α is 7 degrees. As an example: when the depth d of the depression is 0.4 mm the height H is 0.054 mm with the prior art insert and 0.005 mm with the present invention. FIG. 9D shows the height H of the rib as a function of the clearance angle α when the diameter D of the work piece is 30 mm and the depth d of the depression is 0.5 mm. As an example: when the angle α is 6 degrees the height H is 0.06 mm with the conventional insert and constant 0.008 with the present insert.

FIGS. 10 and 11 show an alternative embodiment of an insert according to the invention. The insert 30 comprises a rake face 31, a number of clearance faces 32 and a support surface. The rake face and the clearance face form an acute edge angle. The intersections of the rake and clearance faces form cutting edges 34, each of which extends tranversely of a front-to-rear direction F' (such direction being considered with respect to whichever cutting edge is disposed in a cutting position). Each cutting edge is intersected by spaced grooves or depressions 33 extending on the rake face starting from a projection 36 on the clearance face 32. The projection 36 has the shape of a segment of a cone, whose apex faces away from the rake face. The cutting insert is provided with nonlinear cutting edges, i.e. curved or broken cutting edges. Alternatively the depressions 33 may intersect each other. As previously stated the intersection of the depression 33 and the projection 36 form a straight line when viewed along a certain plane separated from the plane of the clearance face. Therefore this insert produces a planar surface in the work piece without producing ribs at the same time as it increases the plastic deformation or stiffening of the chips. This insert is especially suitable for drilling operations.

FIGS. 12 and 13 show yet another alternative embodiment of the present invention. The insert 40 has a rake face 41 and clearance faces 42. The rake face and the clearance face form an acute edge angle. Cutting edges 44 are formed at the intersections of the rake and clearance faces. Along the cutting edges there are chip breakers in the form of grooves surrounding the central part of the insert 40. The cutting edge 44 is formed so that it describes a curve composed of convex parts in the plane of the clearance face and concave parts along the intersections of the depressions 43 and the projections 46. Each projection has the shape of a segment of a cone whose apex faces away from the rake face. The cutting edge consists of two concave parts next to the corner-radii of the insert and an intermediate convex part. Alternatively the arched parts may be larger in number. As mentioned earlier the cutting edge is straight when seen along a certain plane due to the provisions of the projections 46. A land 47 extends along the cutting edge to strengthen said edge.

Thus the present invention relates to a cutting tool having means for compensating for irregularities on the work piece surface during the machining. Therefore the machined surface does not need any additional finishing operations. The tool also has an excellent chipforming capacity.

I claim:

1. A cutting tool for use in chipforming machining of workpieces comprising a body having a rake face extending in a generally front-to-rear direction of said body, a clearance face defining a clearance angle relative to said rake face and intersecting a front end of said rake face to form therewith a cutting edge extending generally transversely of said front-to-rear direction, said cutting edge being intersected by at least one depression formed in said rake face, a forwardly protruding projection arranged on said clearance face and intersecting said depression along a portion of said cutting edge, said portion containing no depressions when said rake face is viewed in plan.

2. A cutting tool according to claim 1, wherein said portion appears straight when said rake face is viewed in plan.

3. A cutting tool according to claim 1, wherein the outer periphery of the projection forms a segment of a cylinder extending along the clearance face.

4. A cutting tool according to claim 1, wherein the outer periphery of the projection forms a segment of a cone extending along the clearance face, the apex of said cone facing away from said rake face.

5. A cutting tool according to claim 1, wherein the depression is defined by a concave recess, and the line formed by the intersection of the projection and depression is curved and has a radius of curvature equal to the radius of curvature of the depression.

6. A cutting tool according to claim 1, wherein the length of said depression in said front-to-rear direction is larger than the depth of said depression.

7. A cutting tool according to claim 1, wherein said tool constitutes a groove cutting tool having one depression and one projection arranged symmetrically about a mid-line of the tool.

8. A cutting tool according to claim 1, wherein said tool constitutes a polygonal cutting insert comprising said rake face, a plurality of said clearance faces, the lines of intersection of said rake and clearance faces defining cutting edges, each said cutting edge being intersected by a plurality of said depressions, there being a said projection for each depression.

9. A cutting tool according to claim 1, wherein said tool constitutes a polygonal cutting insert having a plurality of said cutting edges, each cutting edge comprising alternating concave and convex parts in the plane of the clearance face.

10. A cutting tool according to claim 1, wherein the dimension of said projection perpendicular to said clearance face is a function of the depth of said depression.

11. In a cutting tool for use in chipforming machining of workpieces comprising a body having a chip guiding face and a clearance face extending in an inclined direction defining a clearance angle relative to said chip guiding face and intersecting a front end of said chip guiding face to form therewith a cutting edge disposed generally transversely of a front-to-rear direction of said body, a midpoint of said cutting edge being spaced below an imaginary reference line interconnecting the ends of said cutting edge, the improvement wherein said clearance face protrudes in a forward direction beyond a reference plane, said reference plane containing said reference line and extending parallel to said direction of inclination of said clearance face, said clearance face protruding beyond said reference plane such that said cutting edge appears straight when said chip guiding face is viewed in plan.

* * * * *